(12) United States Patent
Agarwal et al.

(10) Patent No.: US 10,949,523 B2
(45) Date of Patent: Mar. 16, 2021

(54) METHOD AND ELECTRONIC DEVICE FOR PROVIDING IMAGE-BASED CAPTCHA CHALLENGE

(71) Applicant: Indian Institute of Technology Bombay, Mumbai (IN)

(72) Inventors: Vishal Agarwal, Mumbai (IN); Lalduhbera Hlychho, Bengaluru (IN); Ajit Rajwade, Mumbai (IN); Venkatakrishnan Ramaswamy, Bangalore (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 318 days.

(21) Appl. No.: 15/937,865

(22) Filed: Mar. 28, 2018

(65) Prior Publication Data
US 2019/0303555 A1   Oct. 3, 2019

(51) Int. Cl.
*G06F 21/00* (2013.01)
*G06F 21/36* (2013.01)
*H04L 9/32* (2006.01)
*G06T 15/04* (2011.01)
*G06T 3/00* (2006.01)
*G06T 3/40* (2006.01)
*G06F 3/0484* (2013.01)

(52) U.S. Cl.
CPC ............ *G06F 21/36* (2013.01); *G06T 3/0093* (2013.01); *G06T 3/40* (2013.01); *G06T 15/04* (2013.01); *H04L 9/3271* (2013.01); *G06F 3/04842* (2013.01); *G06F 2221/2133* (2013.01)

(58) Field of Classification Search
CPC .. G06F 2221/2133; G06F 21/36; G06F 21/31; G06F 2221/2103; G06F 21/32
See application file for complete search history.

(56) References Cited

U.S. PATENT DOCUMENTS

| 8,209,743 | B1 * | 6/2012 | Frank | G09C 5/00 726/2 |
| 9,501,651 | B2 * | 11/2016 | Rapaport | G06F 21/31 |
| 2012/0222100 | A1 * | 8/2012 | Fisk | G06F 21/36 726/7 |

\* cited by examiner

*Primary Examiner* — Ghazal B Shehni

(57) ABSTRACT

Method and electronic device for providing image-based CAPTCHA challenge Embodiments herein achieve an electronic device for providing an image-based CAPTCHA challenge. The electronic device is configured to cause to display the image-based CAPTCHA challenge for a user of the electronic device. The image-based CAPTCHA challenge includes a first image and a second image of an object displayed from different viewpoints. The first image includes a challenge point in at least one portion of the object. The electronic device is further configured to detect at least one input from the user indicating the at least one challenge point on at least one portion of the second image. The electronic device is further configured to automatically determine whether the at least one portion of the second image on which the at least one input performed by the user corresponds to the at least one portion of the first image where the challenge point is displayed to qualify the user as a human.

20 Claims, 20 Drawing Sheets

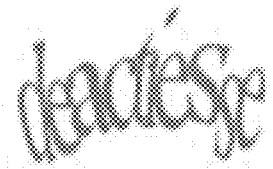
FIG. 1a
(Prior Art)
FIG. 1b
(Prior Art)
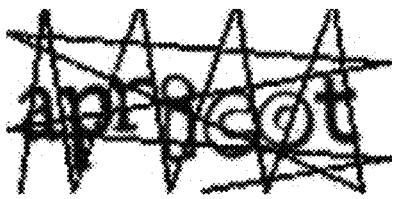
FIG. 1c
(Prior Art)
FIG. 1d
(Prior Art)
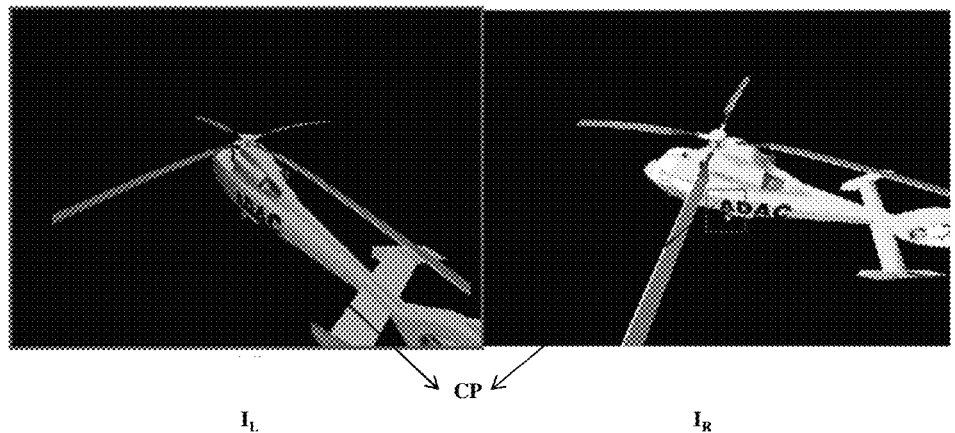
$I_L$    $I_R$
FIG. 2

$I_L$ CP $I_R$ $I_L$ CP $I_R$ $I_L$  $I_R$ $I_L$  $I_R$ $I_L$  $I_R$ $I_L$  $I_R$ $I_L$ $I_R$ $I_L$ $I_R$ $I_L$ $I_R$

METHOD AND ELECTRONIC DEVICE FOR PROVIDING IMAGE-BASED CAPTCHA CHALLENGE

TECHNICAL FIELD

The present disclosure relates to a method for providing an image-based Completely Automated Public Turing test to Tell Computers and Humans Apart (CAPTCHA) challenge on an electronic device.

BACKGROUND

Generally, a CAPTCHA is used to identify whether a user is a human or a computer program. The CAPTCHA is designed in order to prevent computer programs from abusing or misusing a service offered by various websites and at the same time letting an intended user (i.e., human) enjoy the service without much hassle. They are a vital security component for websites which offer services like electronic mail, online polls, blogs/forums, social networking and many more. For instance, consider an email service which offers free creation of user accounts and does not require the user to solve a CAPTCHA challenge. In this scenario, automated programs or robots are capable of creating a huge number of dummy accounts wasting company's resources. Moreover, it could damage the quality of service offered by the company, by spamming other human users with irrelevant emails. Similarly this lack of protection using the services could be leveraged upon by automated scripts to post garbage comments to articles on a blog. This creates a bad experience for the user and also leads to wastage of server resources. This leads the service provider to make it compulsory for the users to solve the CAPTCHA challenge before the user is about to use the offered service. In the existing methods, the CAPTCHA is generated in a form of a text based CAPTCHA (as shown in the FIGS. 1a to 1d) and an image based CAPTCHA.

Text based CAPTCHA: A sequence of distorted characters is presented to the user in the form of an image. The sequence of the characters can be a word drawn from a dictionary or a meaningless word where each character of the sequence is randomly drawn from a charset. A charset is a collection of letters, digits and symbols. In an example 0-9, a-z, and A-Z are few common charsets. A background of the image is cluttered in order to strengthen the security of the CAPTCHA.

Further, two main techniques are used when designing the CAPTCHA in order to protect the service from the machine attack: (1) Anti-Segmentation and (2) Anti-Recognition. The anti-segmentation purposes to prevent the CAPTCHA from being split into its individual characters, while the anti-recognition refers to those text/image manipulation techniques that protect individual characters from machine recognition. Usually the anti-recognition technique is used in conjunction with the anti-segmentation technique to ensure maximum security.

But, the existing methods and the existing systems are effective to a degree in providing an image-based CAPTCHA challenge on an electronic device but includes both advantages and disadvantages in terms of human recognizability, security, vulnerability, memory usage, accuracy, reliability, or the like.

Thus, there remains a need of a robust system and method for providing the image-based CAPTCHA challenge on the electronic device.

SUMMARY

Embodiments herein disclose a computer-implemented method for providing an image-based CAPTCHA challenge on an electronic device. The method includes causing to display the image-based CAPTCHA challenge for a user of the electronic device. The image-based CAPTCHA challenge includes a first image and a second image of at least one object displayed from different viewpoints. The first image includes at least one challenge point (CP) in at least one portion of the object. Further, the method includes detecting at least one input from the user indicating the at least one challenge point in at least one portion of the second image. Furthermore, the method includes automatically determining whether the at least one portion of the second image on which the at least one input performed by the user corresponds to the at least one portion of the first image where the challenge point is displayed to qualify the user as a human.

In an embodiment, automatically determining whether the at least one portion of the second image on which the at least one input performed by the user corresponds to the at least one portion of the first image where the challenge point is displayed to qualify the user as the human comprises automatically determining whether the input selected by the user in the second image is substantially similar to the at least one challenge point associated with the first image based on at least one threshold, and determining the user as the human in response to determining that the input selected by the user in the second image is substantially similar to the at least one challenge point associated with the first image.

In an embodiment, the second image is a manipulated version of the first image.

In an embodiment, the second image is obtained from the manipulated version of the first image by at least one of the following ways: a) rendering the second image under a lighting condition different than a lighting condition used for rendering the first image, b) at least one of shading a three dimensional (3D) model to generate the second image, applying a texture imposition on the 3D model to generate the second image, changing a reflectance property of the 3D model to generate the second image, where the 3D model is obtained from a storage, c) at least one applying dithering to the second image, applying noise to the second image, applying blur to the second image, applying occlusions to the second image, applying affine to the second image, and applying non-rigid spatial warps to the second image, d) changing of scale of the second image, e) changing a background portion of the second image while rendering the second image, f) modifying the object in the second image while rendering the second image, where the object is modified by at least one of including an extraneous object in the 3D model of the scene and removing the objects from the 3D model of the scene, while rendering the each of the images, and g) modifying the pose of the rigged 3D model to generate the second image.

In an embodiment, the first image and the second image display a rigged model of the object, where the rigged model of the object is displayed in the first image from a viewpoint different than a viewpoint in the second image.

In an embodiment, the viewpoint for the second image is generated from the viewpoint of the rigged model of the object in the first image based a plurality of parameters.

In an embodiment, the plurality of parameters includes a distance of a camera from an origin of an object coordinate system, an angle between an optical axis of the camera and Z-axis, and an angle that the optical axis of the camera makes with Y-axis, where a threshold for each of the parameters are set to avoid drastic changes in the viewpoints.

In an embodiment, the rigged model is obtained from one of an existing database of rigged models, and a database of rigged is created offline by the electronic device.

Embodiments herein disclose a computer-implemented method for providing an image-based CAPTCHA challenge on an electronic device. The method includes automatically electing and displaying the image-based CAPTCHA challenge for a user of the electronic device. The CAPTCHA challenge includes at least two images each of which displays at least one rigged model of same object from different viewpoints. Further, the method includes detecting at least one input from the user indicating at least one a challenge point in a portion of the at least one object in one image from the at least two images. Further, the method includes automatically determining whether the portion of the object at which the challenge point indicated by the user corresponds to same portion of the object in another image from the at least two images to qualify the user as a human.

In an embodiment, automatically determining whether the portion of the object at which the challenge point indicated by the user corresponds to same portion of the object in another image from the at least two images to qualify the user as the human comprises automatically determining whether the at least one input from the user indicating the at least one challenge point in the portion of the at least one object in one image is substantially similar to the at least one challenge point associated with the another image based on at least one threshold, and determining the user as the human in response to determining whether the at least one input from the user indicating the at least one challenge point in the portion of the at least one object in one image is substantially similar to the at least one challenge point associated with the another image based on the at least one threshold.

In an embodiment, each of the images are formed by manipulating the at least one rigged model of the object.

In an embodiment, each of the images is obtained from the manipulated version of the at least one rigged model of the object by at least one of the following ways a) rendering each of the images under a lighting condition different than a lighting condition used for rendering the rigged model of the object, b) at least one of shading a 3D model to generate the each of the images, applying a texture imposition on the 3D model to generate the each of the images, changing a reflectance property of the 3D model to generate the each of the images, where the 3D model is obtained from a storage, c) at least one applying dithering to the each of the images, applying noise to the each of the images, applying blur to the each of the images, applying occlusions to the each of the images, applying affine to the each of the images, applying non-rigid spatial warps to the each of the images d) changing of scale of the each of the images, e) changing a background portion of the each of the images while rendering the each of the images, f) modifying the object in the each of the images while rendering the each of the images, wherein the object is modified by at least one of including an extraneous object in the 3D model of the scene and removing the objects from the 3D model of the scene, while rendering the each of the images, and g) modifying the pose of the rigged 3D model in the each of the images while rendering the each of the images.

In an embodiment, the at least one rigged model of the object is displayed in the at least two images from different viewpoints.

In an embodiment, the viewpoint for displaying the at least one rigged model of the at least one object in each of the images are dynamically determined based a distance of a camera from an origin of an object coordinate system, an angle between an optical axis of the camera and Z-axis, and an angle that the optical axis of the camera makes with Y-axis.

In an embodiment, the at least one object is scaled to a fixed dimension while displaying from the different viewpoints in each of the images.

Embodiments herein disclose an electronic device for providing an image-based CAPTCHA challenge. The electronic device is configured to cause to display the image-based CAPTCHA challenge for a user of the electronic device. The image-based CAPTCHA challenge includes a first image and a second image of at least one object displayed from different viewpoints. The first image includes at least one challenge point in at least one portion of the object. The electronic device is further configured to detect at least one input from the user indicating the at least one challenge point in at least one portion of the second image. The electronic device is further configured to automatically determine whether the at least one portion of the second image on which the at least one input performed by the user corresponds to the at least one portion of the first image where the challenge point is displayed to qualify the user as a human.

Embodiments herein disclose an electronic device for providing an image-based CAPTCHA challenge. The electronic device is configured to automatically elect and display the image-based CAPTCHA challenge for a user of the electronic device. The CAPTCHA challenge includes at least two images each of which displays at least one rigged model of same object from different viewpoints. The electronic device is further configured to detect at least one input from the user indicating at least one challenge point at a portion of the at least one object in one image from the at least two images. The electronic device is further configured to automatically determine whether the portion of the object at which the challenge point indicated by the user corresponds to same portion of the object in another image from the at least two images to qualify the user as a human.

Accordingly the embodiment herein provides a computer program product including a computer executable program code recorded on a computer readable non-transitory storage medium. The computer executable program code when executed causing the actions includes causing to display an image-based CAPTCHA challenge for a user of an electronic device. The image-based CAPTCHA challenge includes a first image and a second image of at least one object displayed from different viewpoints. The first image includes at least one challenge point in at least one portion of the object. The computer executable program code when executed causing the actions includes detecting at least one input from the user indicating the at least one challenge point in at least one portion of the second image. The computer executable program code when executed causing the actions includes automatically determining whether the at least one portion of the second image on which the at least one input performed by the user corresponds to the at least one portion of the first image where the challenge point is displayed to qualify the user as a human.

Accordingly the embodiment herein provides a computer program product including a computer executable program code recorded on a computer readable non-transitory storage medium. The computer executable program code when executed causing the actions includes automatically electing and displaying the image-based CAPTCHA challenge for a user of the electronic device. The CAPTCHA challenge includes at least two images each of which displays at least one rigged model of same object from different viewpoints. The computer executable program code when executed causing the actions includes detecting at least one input from the user indicating at least one a challenge point at a portion of the at least one object in one image from the at least two images. The computer executable program code when executed causing the actions includes automatically determining whether the portion of the object at which the challenge point indicated by the user corresponds to same portion of the object in another image from the at least two images to qualify the user as a human.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which:

FIGS. 1a to 1d depict various examples of a CAPTCHA, according to prior art,

FIG. 2 depicts an example of an image-based CAPTCHA, according to embodiments as disclosed herein;

DETAILED DESCRIPTION OF EMBODIMENTS

Figure 3:
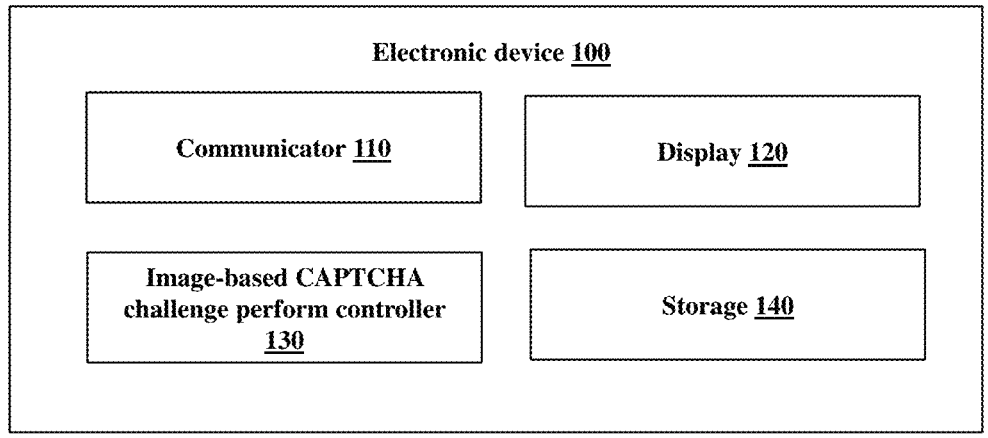
FIG. 3 is a block diagram of an electronic device, according to embodiments as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide an electronic device for providing an image-based CAPTCHA challenge. The electronic device is configured to cause to display the image-based CAPTCHA challenge for a user. The image-based CAPTCHA challenge includes a first image and a second image of an object displayed from different viewpoints. The first image includes at least one challenge point in at least one portion of the object. The electronic device is further configured to detect at least one input from the user indicating the at least one challenge point in at least one portion of the second image. The electronic device is further configured to automatically determine whether the at least one portion of the second image on which the at least one input performed by the user corresponds to the at least one portion of the first image where the challenge point is displayed to qualify the user as a human.

Unlike the conventional methods and systems, the proposed image-based CAPTCHA challenge allows the user to track a particular challenge point (e.g., salient point, true point or the like) from one image of an object to another image of the same object whereas the images are viewed from different viewpoints. This results in improving the robustness of the CAPTCHA challenge test. The proposed method can be used to avoid a hacking issue. The method can be used to provide the image-based CAPTCHA challenge on the electronic device in a convenient and reliable manner to the user.

In the proposed method, the CAPTCHA challenge uses a point tracking procedure in which the user has to track the challenge point from one image of a scene to another image of the same scene under spatial transformations. This results in improving the user experience without any recognizability issue. In the proposed method, the generated image-based CAPTCHA is more secure against such hacking attacks.

The proposed method can be used to improve an accuracy of the response of a human to the image based CAPTCHA challenge in a time effective manner.

Referring now to the drawings and more particularly to FIGS. 2 through 16, where similar reference characters denote corresponding features consistently throughout the figure, these are shown preferred embodiments.

FIG. 2 depicts an example of an image-based CAPTCHA, according to embodiments as disclosed herein. In an embodiment, an electronic device 100 is configured to display an image-based CAPTCHA challenge. The electronic device 100 can be, for example, but not limited to a desktop, a laptop, a mobile phone, a smart phone or the like. The image-based CAPTCHA challenge includes a first image and a second image of an object displayed from different viewpoints. In the disclosure, the first image is also called as a left image ($I_L$) and the second image is also called as a right image ($I_R$). The first image includes at least one challenge point in at least one portion of the object. The challenge point can also be called as a true point or a salient point.

After displaying the image-based CAPTCHA challenge, the electronic device 100 is configured to detect at least one input from the user indicating the at least one challenge point on at least one portion of the second image. After detecting the at least one input from the user indicating the at least one challenge point on the at least one portion of the second image, the electronic device 100 is configured to automatically determine whether the at least one portion of the second image on which the at least one input performed by the user corresponds to the at least one portion of the first image where the challenge point is displayed to qualify the user as a human.

In an embodiment, the electronic device 100 is configured to automatically determine whether the input selected by the user in the second image is substantially similar to the at least one challenge point associated with the first image based on at least one threshold value and determine the user as the human in response to determining that the input selected by the user in the second image is substantially similar to the at least one challenge point associated with the first image. The threshold value is pre-determined threshold value or determined dynamically In an embodiment, the electronic device 100 is configured to automatically determine whether the challenge point selected by the user in the second image is truly close to the point physically corresponding to the challenge point in the first image based on the threshold value.

In an embodiment, the second image is a manipulated version of the first image.

In an embodiment, the second image is obtained from the manipulated version of the first image by rendering the second image under a lighting condition different than a lighting condition used for rendering the first image.

In an embodiment, the second image is obtained from the manipulated version of the first image by at least one of shading the 3D model to generate the second image, applying texture imposition on the 3D model to generate the second image, changing a reflectance property of the 3D model to generate the second image, where the 3D model is obtained from a storage.

In an embodiment, the second image is obtained from the manipulated version of the first image by at least one applying dithering to the second image, applying noise to the second image, applying blur to the second image, applying occlusions to the second image, applying affine to the second image, and applying non-rigid spatial warps to the second image.

In an embodiment, the second image is obtained from the manipulated version of the first image by changing a scale of the second image.

In an embodiment, the second image is obtained from the manipulated version of the first image by changing a background portion of the second image while rendering the second image. In an embodiment, the second image is obtained by modifying the pose of the rigged 3D model.

In an embodiment, the second image is obtained from the manipulated version of the first image by modifying the object in the second image while rendering the second image. The object is modified by at least one of including an extraneous object in the 3D model of the scene and removing the objects from the 3D model of the scene, while rendering the each of the images.

In an embodiment, the first image and the second image display a rigged model of the object, where the rigged model of the object is displayed in the first image from a viewpoint different than a viewpoint in the second image. The rigged model refers to an object warped by means of non-rigid or piecewise-rigid (articulated) motion).

In an embodiment, the viewpoint for the second image is generated from the viewpoint of the rigged model of the object in the first image based a plurality of parameters.

In an embodiment, the plurality of parameters includes a distance of a camera from an origin of an object coordinate system, an angle between an optical axis of the camera and a Z-axis, and an angle that the optical axis of the camera makes with a Y-axis, where a threshold for each of the parameters are set to avoid drastic changes in the viewpoints.

In an embodiment, the parameter can also be, but are not limited to, a lighting condition, a texture, a change in surface property, and a change in background of the object.

In an embodiment, the object is scaled to a fixed dimension while displaying from the different viewpoints in the first image and the second image.

In an embodiment, the rigged model is obtained from one of an existing database of rigged models, and a database of rigged models created offline by the electronic device 100.

In an embodiment, the electronic device 100 is configured to automatically elect and display the image-based CAPTCHA challenge for the user. The CAPTCHA challenge includes at least two images each of which displays at least one rigged model of same object from different viewpoints.

After electing the image-based CAPTCHA challenge, the electronic device 100 is configured to detect at least one input from the user indicating the at least one challenge point at a portion of the at least one object in one image from the at least two images. After detecting the at least one input from the user indicating the challenge point at the portion of the at least one object in one image from the at least two images, the electronic device 100 is configured to automatically determine whether the portion of the object at which the challenge point indicated by the user corresponds to same portion of the object in another image from the at least two images to qualify the user as a human.

In an embodiment, the electronic device 100 is configured automatically to determine whether the at least one input from the user indicating the at least one challenge point in the portion of the at least one object in one image is substantially similar to the at least one challenge point associated with the another image based on at least one threshold. Further, the electronic device 100 is configured to determine the user as the human in response to determining whether the at least one input from the user indicating the at least one challenge point in the portion of the at least one object in one image is substantially similar to the at least one challenge point associated with the another image based on the at least one threshold.

In an embodiment, each of the images are formed by manipulating the at least one rigged model of the object.

In an embodiment, each of the images is obtained from the manipulated version of the at least one rigged model of the object by rendering each of the images under the lighting condition different than the lighting condition used for rendering the rigged model of the object.

In an embodiment, each of the images is obtained from the manipulated version of the at least one rigged model of the object by at least one of shading the 3D model to generate the each of the images, applying the texture imposition on the 3D model to generate the each of the images, changing the reflectance property of the 3D model to generate the each of the images.

In an embodiment, each of the images is obtained from the manipulated version of the at least one rigged model of the object by at least one applying dithering to the each of the images, applying the noise to the each of the images, applying the blur to the each of the images, applying the occlusions to the each of the images, applying the affine to the each of the images, applying the non-rigid spatial warps to the each of the images.

In an embodiment, each of the images is obtained from the manipulated version of the at least one rigged model of the object by changing of scale of the each of the images.

In an embodiment, each of the images is obtained from the manipulated version of the at least one rigged model of the object by changing the background portion of the each of the images while rendering the each of the images.

In an embodiment, each of the images is obtained from the manipulated version of the at least one rigged model of the object by modifying the object in the each of the images while rendering the each of the images. The object is modified by at least one of including the extraneous object in the 3D model of the scene and removing the objects from the 3D model of the scene, while rendering the each of the images.

In an embodiment, the at least one rigged model of the object is displayed in the at least two images from different viewpoints.

In an embodiment, the viewpoint for displaying the at least one rigged model of the at least one object in each of the images are dynamically determined based a distance of a camera from an origin of an object coordinate system, an angle between an optical axis of the camera and Z-axis, and an angle that the optical axis of the camera makes with Y-axis.

In an embodiment, the at least one object is scaled to a fixed dimension while displaying from the different viewpoints in each of the images.

FIG. 3 is a block diagram of the electronic device 100, according to embodiments as disclosed herein. The electronic device 100 includes a communicator 110, a display 120, an image-based CAPTCHA challenge perform controller 130, and a storage 140. The communicator 110 is in communication with the display 120, the image-based CAPTCHA challenge perform controller 130 and the storage 140.

The display 120 is configured to display the image-based CAPTCHA challenge for the user of the electronic device 100. The image-based CAPTCHA challenge includes the first image and the second image of the object displayed from different viewpoints. The first image includes the challenge point in at least one portion of the object. After displaying the image-based CAPTCHA challenge, the image-based CAPTCHA challenge perform controller 130 is configured to detect at least one input from the user indicating the at least one challenge point in at least one portion of the second image. After detecting at least one input from the user indicating the at least one challenge point in the at least one portion of the second image, the image-based CAPTCHA challenge perform controller 130 is configured to automatically determine whether the at least one portion of the second image on which the at least one input performed by the user corresponds to the at least one portion of the first image where the challenge point is displayed to qualify the user as the human.

In an embodiment, the image-based CAPTCHA challenge perform controller 130 is configured to automatically elect and display the image-based CAPTCHA challenge for the user of the electronic device 100. The CAPTCHA challenge includes at least two images each of which displays the at least one rigged model of same object from different viewpoints.

After electing and displaying the image-based CAPTCHA challenge, the image-based CAPTCHA challenge perform controller 130 is configured to detect the at least one input from the user indicating the challenge point at the portion of the at least one object in one image from the at least two images. After detecting the at least one input from the user indicating the challenge point at the portion of the at least one object in one image from the at least two images, the image-based CAPTCHA challenge perform controller 130 is configured to automatically determine whether the portion of the object at which the challenge point indicated by the user corresponds to same portion of the object in another image from the at least two images to qualify the user as the human.

The storage 140 stores the 3D model and the rigged model. The storage 140 also stores instruction to perform the CAPTCHA challenge on the electronic device 100. The storage 140 also stores the program to be executed by the processor. The storage 140 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage 140 may, in some examples, be considered a non-transitory storage medium. The term "non-transitory" may indicate that the storage medium is not embodied in a carrier wave or a propagated signal. However, the term "non-transitory" should not be interpreted that the storage 140 is non-movable. In some examples, the storage 140 can be configured to store larger amounts of information than the memory. In certain examples, a non-transitory storage medium may store data that can, over time, change (e.g., in Random Access Memory (RAM) or cache).

Although the FIG. 3 shows various hardware compounds of the electronic device 100 but it is to be understood that other embodiments are not limited thereon. In other embodiments, the electronic device 100 may include less or more number of hardware compounds. Further, the labels or names of the hardware compounds are used only for illustrative purpose and does not limit the scope of the invention. One or more hardware compounds can be combined together to perform same or substantially similar function to provide the image-based CAPTCHA challenge on the electronic device 100.

Figure 4:
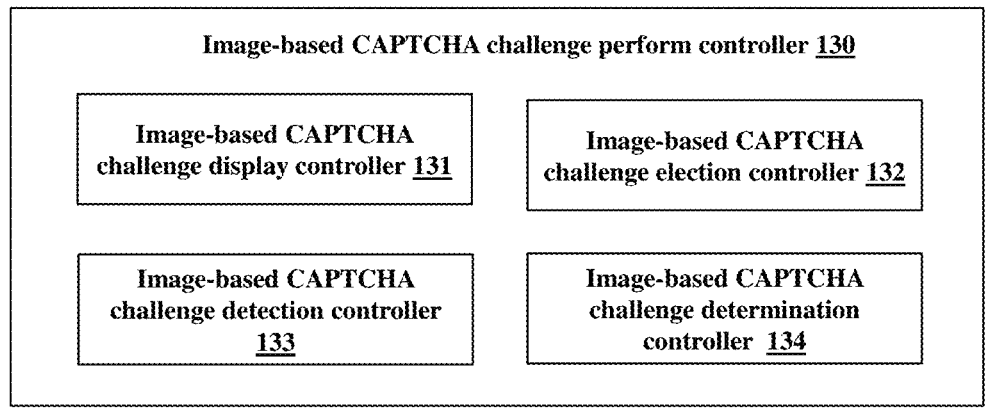
FIG. 4 is a block diagram of an image-based CAPTCHA challenge perform controller, according to embodiments as disclosed herein.

FIG. 4 is a block diagram of the image-based CAPTCHA challenge perform controller 130, according to embodiments as disclosed herein. In an embodiment, the image-based CAPTCHA challenge perform controller 130 includes an image-based CAPTCHA challenge display controller 131, an image-based CAPTCHA challenge election controller 132, an image-based CAPTCHA challenge detection controller 133 and an image-based CAPTCHA challenge determination controller 134.

In an embodiment, the image-based CAPTCHA challenge display controller 131 is configured to display the image-based CAPTCHA challenge. The image-based CAPTCHA challenge includes the first image and the second image of the object displayed from different viewpoints. The first image includes the challenge point in at least one portion of the object.

After displaying the image-based CAPTCHA challenge, the image-based CAPTCHA challenge detection controller 133 is configured to detect at least one input from the user indicating the at least one challenge point on at least one portion of the second image. After detecting the at least one input from the user indicating the at least one challenge point on the at least one portion of the second image, the image-based CAPTCHA challenge determination controller 134 is configured to automatically determine whether the at least one portion of the second image on which the at least one input performed by the user corresponds to the at least one portion of the first image where the challenge point is displayed to qualify the user as the human.

In an embodiment, the image-based CAPTCHA challenge election controller 132 is configured to automatically elect the image-based CAPTCHA challenge for the user. The CAPTCHA challenge includes at least two images each of which displays at least one rigged model of same object from different viewpoints. After electing the image-based CAPTCHA challenge, the image-based CAPTCHA challenge detection controller 133 is configured to detect at least one input from the user indicating the challenge point at a portion of the at least one object in one image from the at least two images. After detecting the at least one input from the user indicating the challenge point at the portion of the at least one object in one image from the at least two images, the image-based CAPTCHA challenge determination controller 134 is configured to automatically determine whether the portion of the object at which the challenge point indicated by the user corresponds to same portion of the object in another image from the at least two images to qualify the user as the human.

In the proposed method, the image-based CAPTCHA challenge requires the user to track the particular challenge point (e.g., salient point, true point or the like) from one image of the object (e.g., 3D object, rigged model, or the like) to another image of the same object whereas the images are viewed from the different viewpoints. In the proposed image-based CAPTCHA challenge, such a pair of images is shown to the user, with the first one on a left image and a manipulated version on the right image as shown in the FIG. 2.

In an embodiment, the salient points in the left image are detected using a Scale-Invariant Feature Transform (SIFT) after which a random salient point is selected as the challenge point and is highlighted on the right image. The task of the user is to click on the point corresponding to the challenge point on the right image. The user does not have to click on an exact point, a tolerance region of size around the true point is provided, so that the task is not too difficult for the user (any point inside this region is considered to be a valid point) as shown in the FIG. 2.

In an example, as shown in the FIG. 2, the left and right images, denoted as $I_L$ and $I_R$, are generated by projecting the 3D object from two different viewpoints. After the 3D object is selected from the storage 140, the 3D object is rendered using a cross-platform application programming interface (e.g., Open Graphics Library (OpenGL) or the like). The objects are scaled to a fixed dimension while rendering. A scaling factor depends on a length of a longest dimension. If L is the length of the longest dimension, the object is uniformly scaled with parameter s=L/30.0 for normalization.

Two or three OpenGL light sources are placed at fixed positions for lighting, while another light source is always placed at an OpenGL camera position. The camera is set such that the camera always points toward the center of the object. The point correspondences between the two generated images $I_L$ and $I_R$ are determined using a gluUnProject and gluProject routines from the cross-platform application programming interface. The size of the image $I_L$ and $I_R$ is chosen to be around 400 pixels*600 pixels.

Left Image: The rendered object is viewed from the selected viewpoint $VP_L$ (R, θ, ø), where R is the distance of the camera from an origin of the object coordinate system, θ is an angle between the optical axis of the camera and a Z axis while ø is the angle an optical axis of the camera makes with a Y axis. The parameters R, θ and ø are chosen randomly from their specific ranges as specified below $$R \in [D*0.75-5.0, D*0.75+5.0]$$

$$\theta \in [0,359]$$

$$\emptyset \in [46,90]$$

where D is the distance of a farthest point of the object from a center of the object. Further, some viewpoints may be too near to some parts of the object which may cause undesirable views. Those viewpoints are ignored by computing the distance of some selected object points from the viewpoint. These selected object points should be visible on the display 120. If a percentage of the object points whose distance from the viewpoint is less than a threshold value (i.e., is less than 10.0%), then those viewpoints are not used. The frame from the viewpoint $VP_L$ (R, θ, ø) is used as the left image.

Challenge Point: The challenge point (CP) $(x_L, y_L)$ is randomly selected from the set of key points $P_L$ from the left image $I_L$. The key points $P_L$ can be generated from $I_L$ using either SIFT or fast salient feature point detectors. These two-dimensional key points $P_L$ in a display unit coordinate system are mapped to 3 dimensional (3D) object points OP in a world coordinate system using an OpenGL function gluUnProject. The object points OP are used for finding corresponding points of the $P_L$ in the right image ($I_R$). The object point $(O_x, O_y, O_z)$ corresponding to the challenge point, should be visible in the right image $I_R$. In fact, special care of this is taken during the generation of the CAPTCHA instances.

Right Image: The 3D object is rendered again but from the different viewpoint. A new viewpoint $VP_R$ is generated from the original viewpoint $VP_L$ by adding or subtracting a random value to the three parameters R, θ, and ø. The viewpoint is changed from $VP_L$, (R, θ, ø) to $VP_R$ (R', θ', ø') such that the object point corresponding to the challenge point remains visible while rendering $I_R$. The viewpoint parameters for $I_R$ are given as follows:

$$R' = R \pm \delta R$$

$$\theta' = \theta \pm \delta \theta$$

$$\emptyset' = \emptyset \pm \delta \emptyset$$

Further, a minimum and maximum threshold for each parameter is set, such that the changes do not affect human recognition drastically, but affect machine attack accuracy. In an example, chosen parameters are as follows:

$$\delta R \in [-90,-30] \cup [30,90]$$

$$\delta \theta \in [-90,-30] \cup [30,90]$$

$$\delta \emptyset \in [10,14]$$

The frame rendered from the viewpoint $VP_R$ is used as the right image $I_R$.

Fundamental matrix estimation: In an embodiment, the A SIFT descriptor matching along with a RANSAC is used to estimate a fundamental matrix given the CAPTCHA instance. Corresponding pairs of points in the two images $I_L$ and $I_R$ are related by the fundamental matrix F since the two images are images of the same object viewed from the different viewpoints. Two corresponding points, $p_L$ in $I_L$ and $P_R$ in $I_R$, are related by the fundamental matrix F as per equation 2.1

$$p_L{}^t F_{p_R} = 0 \qquad (1)$$

The points $p_L$ and $P_R$ are in homogeneous coordinates (with their x and y coordinates measured in the respective image coordinate systems) and F is a 3*3 matrix. The first two rows of F are linearly independent and the third row is the linear combination of the first two. Hence, F is a rank 2 matrix. Also, F is independent of scale and has only 7 degrees of freedom.

$$F = \begin{bmatrix} a & d & \alpha \\ b & e & \beta \\ c & f & \gamma \end{bmatrix} \qquad (2)$$

Equation (1) shows that if $p_L$ and F are known, then 1 is the equation of line in the $I_R$ on which the point $P_R$ must lie. In this proposed method, for each pair of CAPTCHA images, the method includes computing the fundamental matrix using RANSAC and the eight point procedures. Using this estimated F, the method includes determining the equation of the line using equation (3) where $(x_1, y_1)$ is the SIFT salient point which best matches the challenge point in $I_L$. The line given by equation (3) is called an epipolar line (line in $I_R$ on which the point corresponding to $(x_1, y_1)$ must lie). Further, the method includes performing the SIFT descriptor matching for only those salient points which satisfy equation (3). Then, the nearest neighbor is considered to be a final estimated point.

$$[x_1 \ y_1 \ 1] F \begin{bmatrix} x \\ y \\ 1 \end{bmatrix} = 0 \qquad (3)$$

RANSAC: In an embodiment, the RANSAC can be used to robustly estimate the fundamental matrix. In the RANSAC, the method including determining corresponding salient points between $I_L$ and $I_R$ by using the SIFT descriptor. The SIFT descriptor in the $I_L$ is matched to that the SIFT descriptor in the $I_R$ which provides the minimum Root Mean Square Deviation (RMSD). Since the SIFT descriptor is not invariant under out of plane rotations, the mismatches are happing. The mismatches can also occur due to feature occlusions and self-similarity of the images. Further, the method includes choosing 8 random pairs of corresponding points for estimating F. The number of other pairs which are compatible with this F (called inliers) are determined. The above steps are repeated a finite number of times. Finally, that F is chosen for which the number of inliers are maximum.

Eight point procedure: Given 8 pairs of corresponding points, the method can estimate F. Each of these 8 pairs should satisfy equation 3. This can be succinctly represented as equation 4 or equation 5.

$$\begin{bmatrix} x_{r,1}x_{l,1} & x_{r,1}y_{l,1} & x_{r,1} & y_{r,1}x_{l,1} & y_{r,1}y_{l,1} & y_{r,1} & x_{l,1} & y_{l,1} & 1 \\ x_{r,2}x_{l,2} & x_{r,2}y_{l,2} & x_{r,2} & y_{r,2}x_{l,2} & y_{r,2}y_{l,2} & y_{r,2} & x_{l,2} & y_{l,2} & 1 \\ \vdots & & & & & & & & \vdots \\ \vdots & & & & & & & & \vdots \\ \vdots & & & & & & & & \vdots \\ \vdots & & & & & & & & \vdots \\ x_{r,8}x_{l,8} & x_{r,8}y_{l,8} & x_{r,8} & y_{r,8}x_{l,8} & y_{r,8}y_{l,8} & y_{r,8} & x_{l,8} & y_{l,8} & 1 \end{bmatrix} \begin{bmatrix} F_{11} \\ F_{12} \\ F_{13} \\ F_{21} \\ F_{22} \\ F_{23} \\ F_{31} \\ F_{32} \\ F_{33} \end{bmatrix} = \begin{bmatrix} 0 \\ 0 \\ 0 \\ 0 \\ 0 \\ 0 \\ 0 \\ 0 \\ 0 \end{bmatrix} \quad (4)$$

$$Af = 0 \quad (5)$$

The proposed method includes computing a f (which contains the 9 entries of F) by computing the SVD of A (size 8 by 9) and taking the column vector from V corresponding to the least singular value. The solution is obtained up to an arbitrary sign and scaling constant. The method includes rearranging elements of f to give F (up to a scaling constant and sign). The previous step does not guarantee the rank-deficiency of F. So, the method includes computing SVD of F and nullify its smallest singular value. This gives us the final F [10].

Figure 5A:
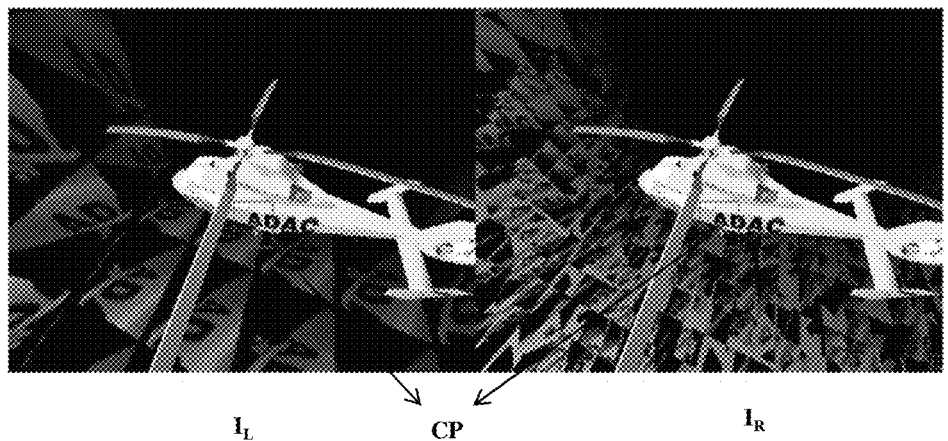
FIGS. 5a to 5c depict an example of the image-based CAPTCHA including obfuscated characters, according to embodiments as disclosed herein.
Figure 5B:
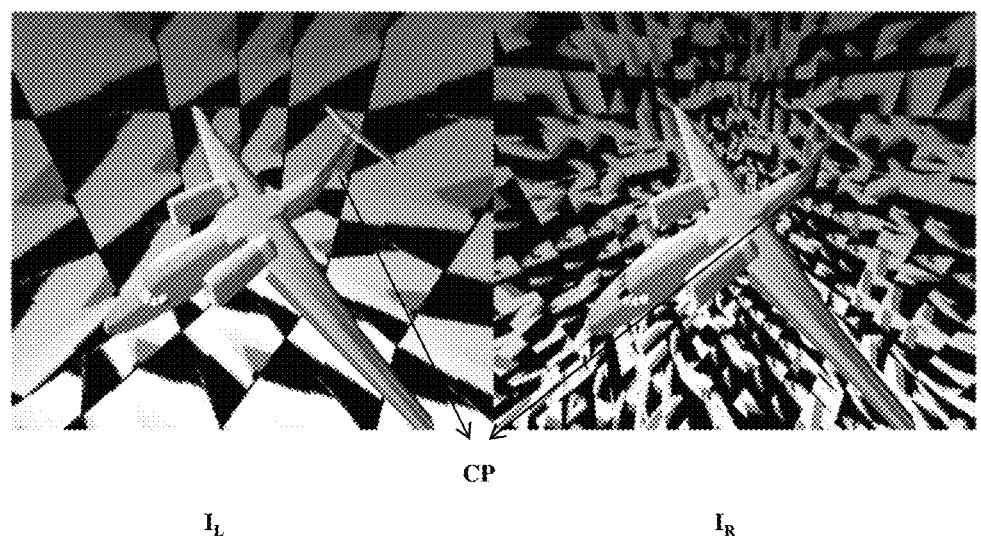
Figure 5C:
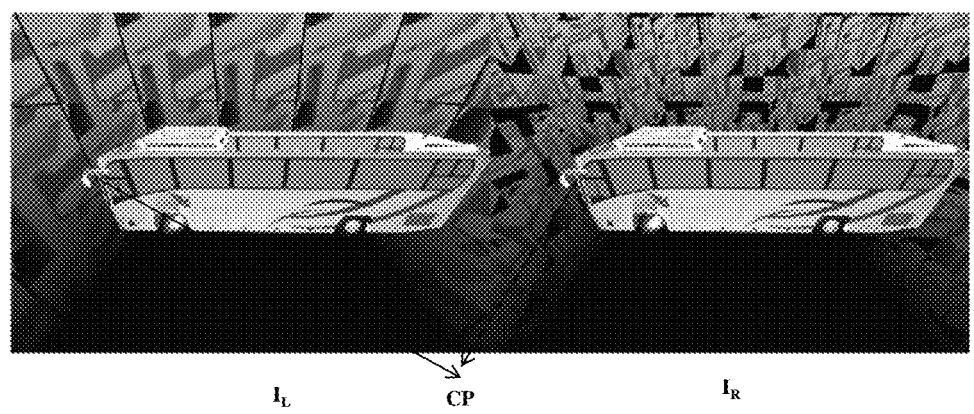
Figure 6A:
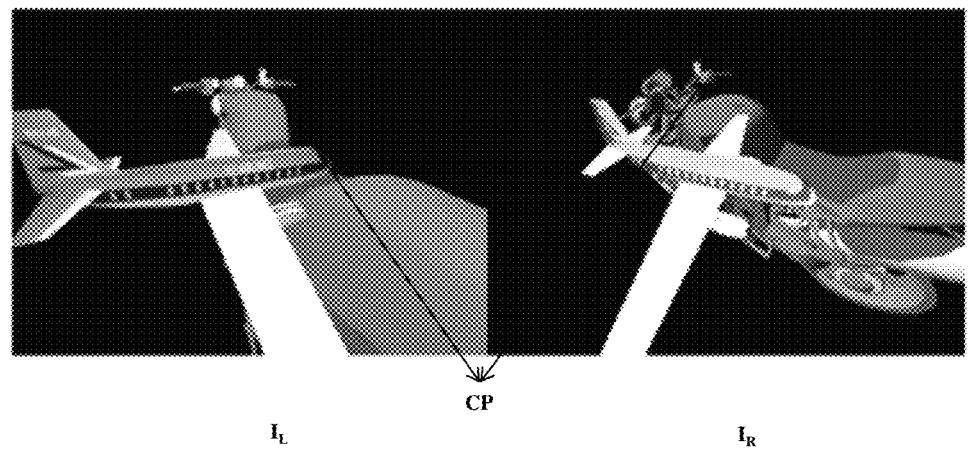
FIGS. 6a to 6c depict an example of the image-based CAPTCHA including two models in a same scene, according to embodiments as disclosed herein.
Figure 6B:
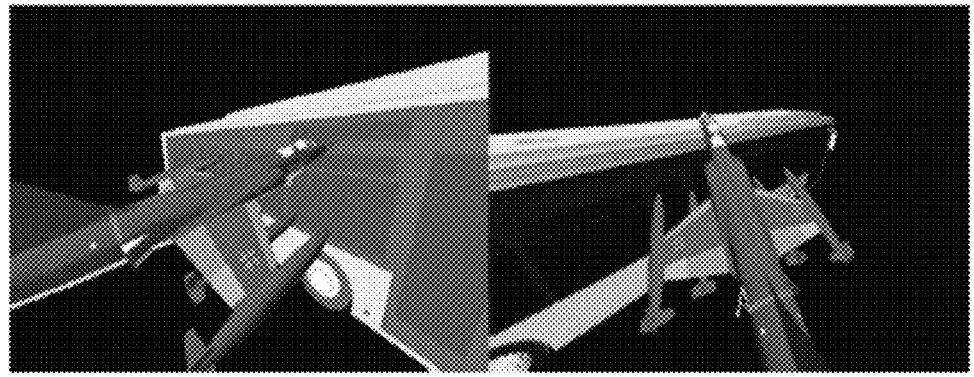
Figure 6C:
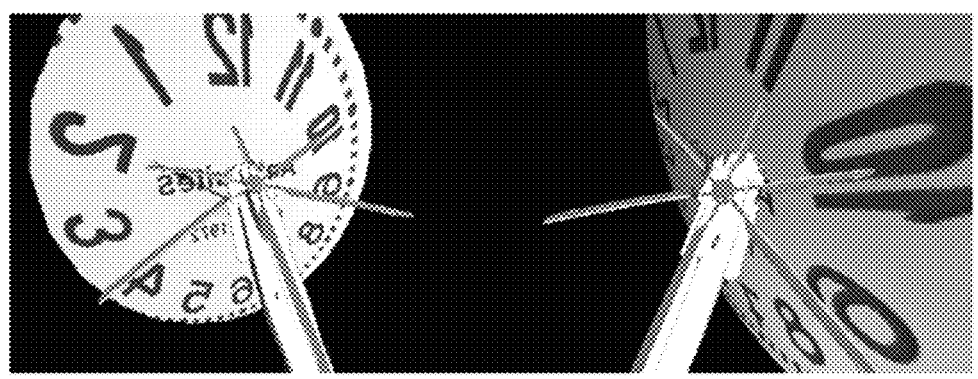
Figure 7A:
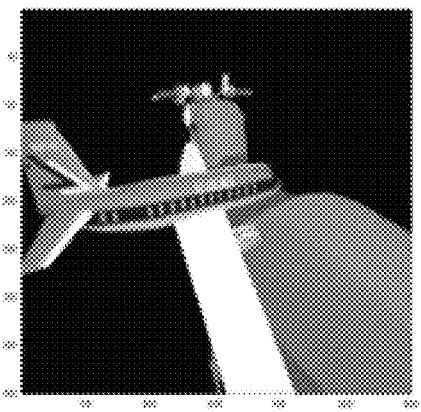
FIGS. 7a to 7f depict an example of multi model CAPTCHAs with complex obfuscation, according to embodiments as disclosed herein.
Figure 7A:
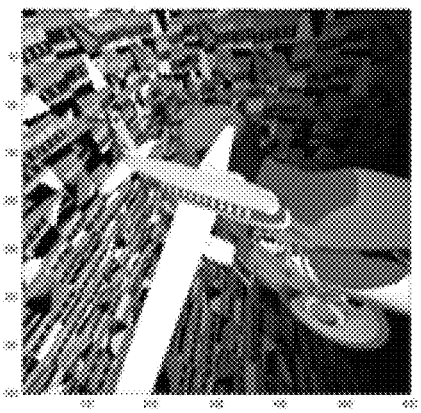
Figure 7B:
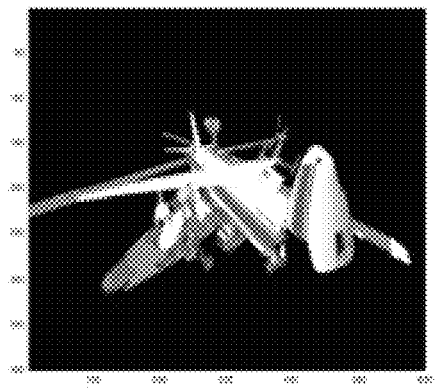
Figure 7B:
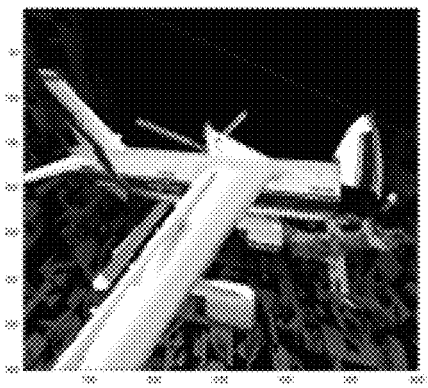
Figure 7C:
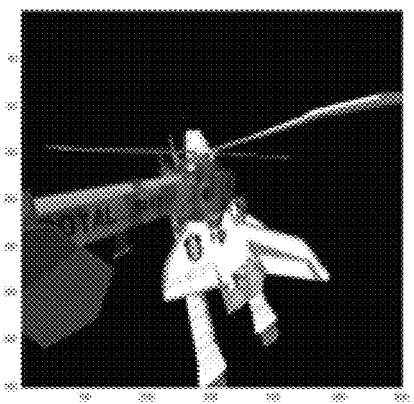
Figure 7C:
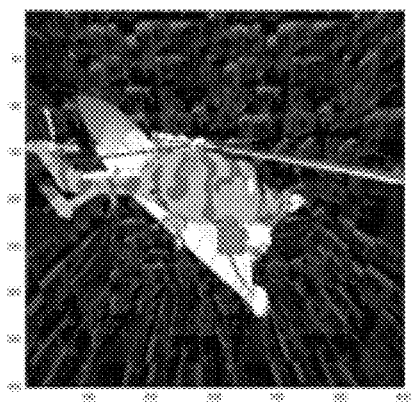
Figure 7D:
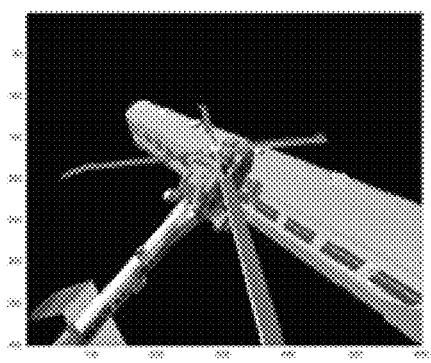
Figure 7D:
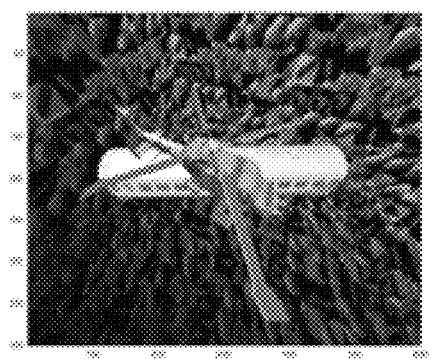
Figure 7E:
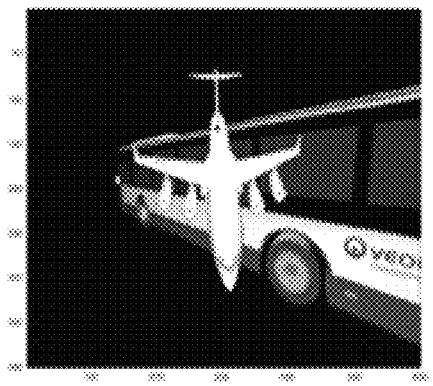
Figure 7E:
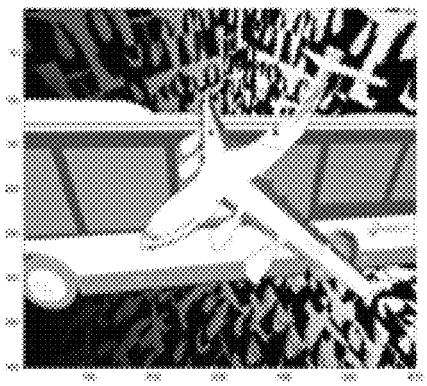
Figure 7F:
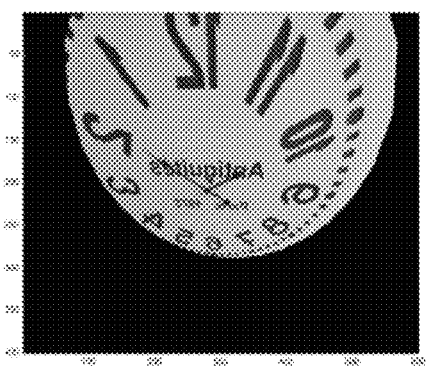
Figure 7F:

In an example, the image-based CAPTCHA including obfuscated characters are depicted as shown in the FIGS. 5a to 5c. In the proposed method, 64 random patches are utilized from the left image as the obfuscation patches. The obfuscated characters, for example, can range in appearance from undistorted shapes, which appear to be comprised of multiple characters, to virtually shapeless blobs. In an example, the image-based CAPTCHA including two models in a same scene are depicted as shown in the FIGS. 6a to 6c. In an example, multi-model CAPTCHAs with complex obfuscation are depicted as shown in the FIGS. 7a to 7f.

Multiple models: In an embodiment, the method includes introducing multiple objects in the CAPTCHA instead of only one object. Further, both the objects are given different out of plane motions to ensure that a single fundamental matrix cannot be used to represent the two motions.

In an embodiment, the method includes randomly choosing two objects from the storage 140. Further, the method includes positioning the two objects in different orientations to ensure that there is sufficient overlap among the objects. In this condition, when viewed from the particular viewpoint constitutes the left image $I_L$. Further, the method includes rotating the two objects through two different out of plane rotations respectively. In this condition, when viewed from a randomly selected viewpoint forms the right image $I_R$. Further, the method includes generating the CAPTCHA with multiple models.

In an embodiment, the method includes generating the CAPTCHA with multiple models by overlapping multiple instances of the CAPTCHA with one model.

Estimating motion of multiple objects: In an embodiment, the method can be used to estimate the fundamental matrices corresponding to each of the objects in the scene. In an embodiment, the method includes determining the 7 closest neighbours in 2D euclidean space in $I_L$. Further, the method includes determining points corresponding to the 8 points in $I_R$ using the SIFT descriptor matching procedure. Further, the method includes estimating the fundamental matrix using these 8 pairs of corresponding points. Further, the method includes normalizing the estimated fundamental matrix. Further, the method includes adding the normalized fundamental matrix provided to a set of fundamental matrices. Repeat for each salient point in $I_L$. Further, the method includes using a variant (K) to find the modes of this distribution. Further, the method includes determining the cluster to which the challenge point belongs. As shown in the FIGS. 7a to 7f, the CP is marked in blue. The estimated point is marked in red. The line in the right image is the epipolar line.

Parameterization of the fundamental matrix: The 3*3 matrix (Equation 2) is independent of scale. The method can be used to estimate the epipolar line according to the equation 1. This allows to set the parameter f of the fundamental matrix to 1. After rescaling the fundamental matrix, the method includes representing the fundamental matrix as a 8 tuple as is shown in equation 4. This allows to do clustering in the space of fundamental matrices. This parameterization has been proposed earlier.

$$F'=[a/f\ b/f\ c/f\ d/f\ e/f\ a/f\ y/f] \quad (6)$$

Figure 8A:
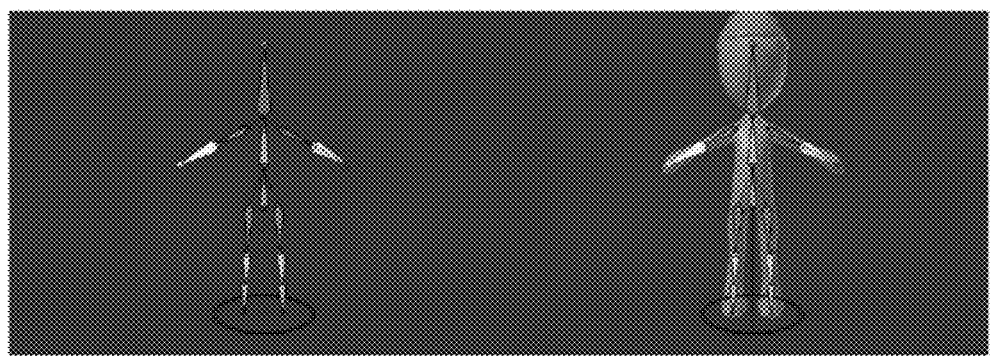
FIG. 8a depicts a skeleton along with a three dimensional (3D) model, according to embodiments as disclosed herein.
Figure 8B:
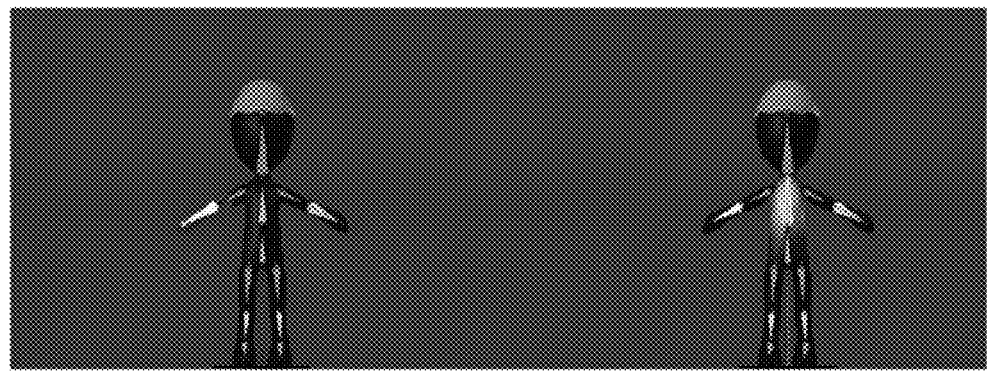
FIG. 8b depicts weights for bones in the 3D model, according to embodiments as disclosed herein.

Rigged 3D Models: A character rig is essentially a digital skeleton bound to the 3D mesh. Like a real skeleton, a rig is made up of joints and bones, each of which act as a "handle" that animators can use to bend the character into a desired pose. The FIG. 8a shows the skeleton along with the 3D model. Each vertex of a static 3D mesh associates a weight to each bone. In simpler words the weight quantifies how tightly a vertex is attached to the bone. The FIG. 8b shows weights for two bones.

Figure 8C:
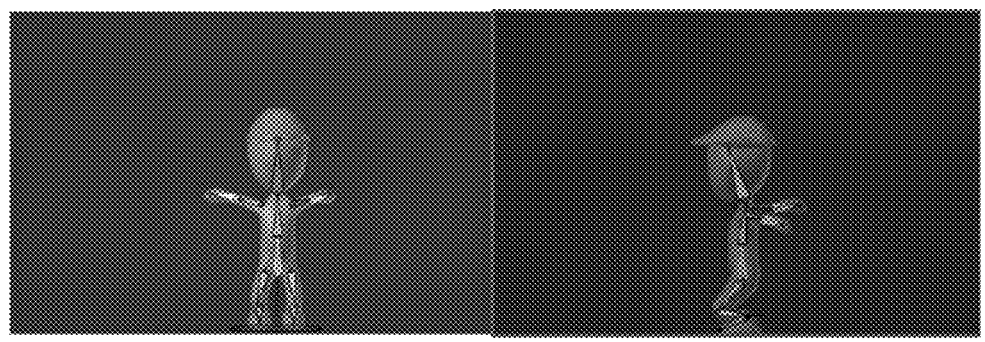
FIG. 8c depict an effect of moving a stomach bone, according to embodiments as disclosed herein.

In an embodiment, once the model is rigged, the bone can be moved any side and the model is guaranteed that the skeleton hierarchy will be maintained. The 3D mesh is automatically deformed to maintain the new configuration. The FIG. 8c shows the effect of moving the "stomach" bone. As is evident the skeleton hierarchy is maintained and the mesh is deformed to match the new configuration.

Figure 9A:
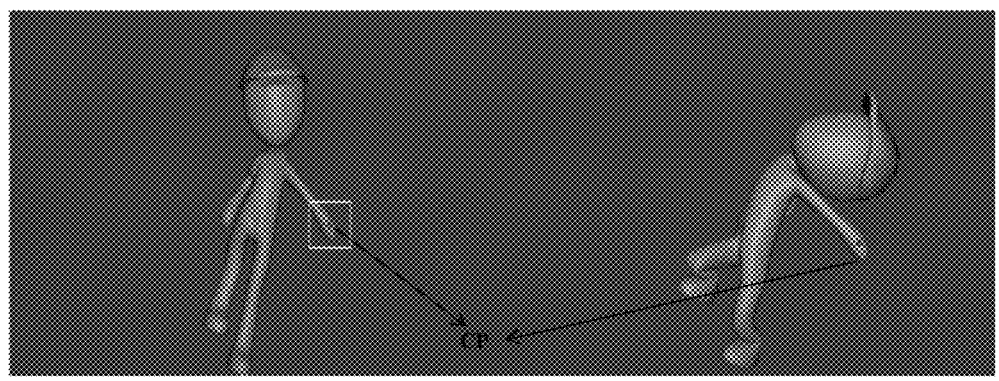
FIGS. 9a to 9c depict the CAPTCHA with a rigged 3D model, according to embodiments as disclosed herein.
Figure 9B:
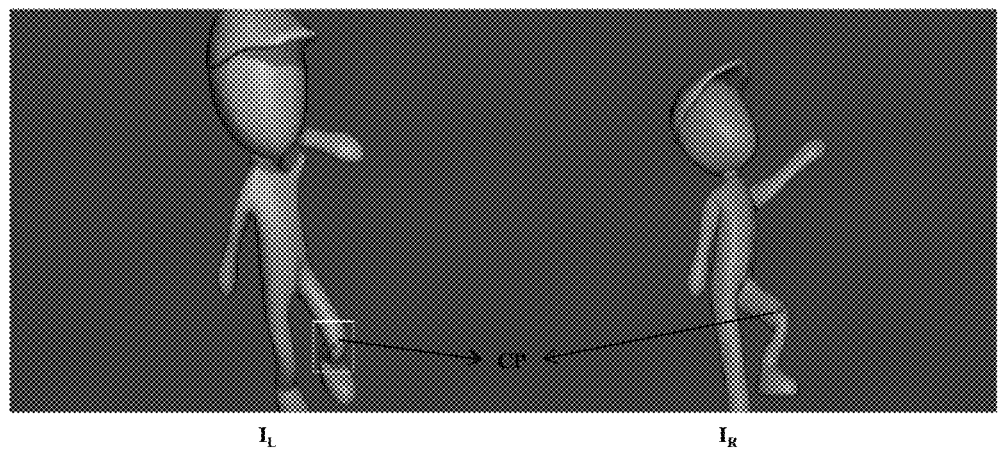
Figure 9C:
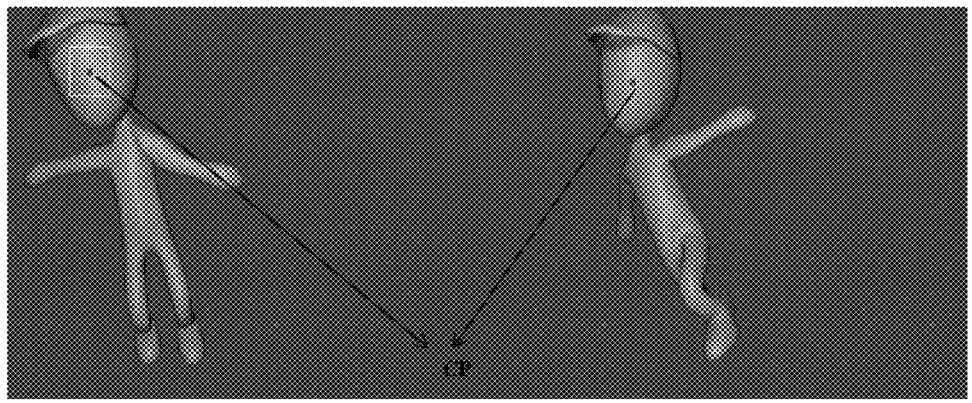
Figure 10A:
FIGS. 10a and 10b depict a pose estimation with the rigged model, according to embodiments as disclosed herein.
Figure 10B:

In an embodiment, once the model is rigged, any bone/group of bones are moved to generate a new CAPTCHA instance. The FIGS. 9a to 9c show an instances of the CAPTCHA with the rigged model. Compared with existing CAPTCHA, the proposed CAPTCHA is more robust as the hacker now has to not only estimate the global transformation parameters but also a local configuration of every joint. Each joint is associated with at least 3 degrees of freedom and the CAPTCHA with the rigged model have 8 joints. This indicates that there are 30 degrees of freedom (24 local degrees of freedom+6 global degrees of freedom), thereby making a brute force search infeasible.

The image-based CAPTCHA is attacked by the hacker. The following methods are used to determine a robustness of the image-based CAPTCHA against the attack.

Joint Entropy based attack: In this attack, the method includes rendering the 3D models from different viewpoints (i.e., uniform sampling of the complete parameter space) and creating a database of the two dimensional (2D) images. Further, the method includes rendering the models under different illumination conditions (i.e. directions of one or more light sources). Further, the method includes estimating which image out of this database "best matches" the query image $I_Q$ (either the left image $I_L$ or the right image $I_R$).

Further, the method includes choosing the image from the database (called as a probe image $I_P$) and constructing a joint image histogram JIH using $I_P$ and $I_Q$. The JIH is defined using a function $P(r_{k1}, r_{k2})$ where, $P(r_{k1}, r_{k2})$=number of pixels (x, y) such that $I_1(x, y)$ and $I_2(x, y)$ lie in intensity bins $r_{k1}$ and $r_{k2}$ respectively, divided by the total number of pixels in the image.

The entropy of the JIH, known as the joint entropy, is used as a measure to quantify the accuracy of match (Equation 7). The Joint entropy is a symmetric measure of dispersion of the JIH. It is the least possible when $I_P$ and $I_Q$ are perfectly aligned and the intensities in $I_P$ are functions of the intensities at corresponding locations in $I_Q$. As a result, the method includes choosing that $I_P$ whose JIH with $I_Q$ has the least joint entropy. It is empirically observed that this measure is fairly resistant to various non-linear illumination changes, even those that violate the aforementioned "function-ness" relationship between the intensities in the two images (as shown in the FIG. 10b). This fact makes it a good candidate for the use case. The mutual information is another similar measure which is empirically more robust than joint entropy because it also uses the marginal entropy of the individual images (Equation 9). Hence, mutual information (MI) is used instead of the joint entropy as a measure. In an example, an optimal image alignment is done by maximizing the MI, unlike the joint entropy which is minimized. MI maximization has been widely used for multi-modality image alignment.

$$H(I_P, I_Q) = \sum_x \sum_y P(x, y)\log_2(P(x, y)) \quad (7)$$

$$H(I) = -\sum_x P(x)\log_2(P(x)) \quad (8)$$

$$M(I_P, I_Q) = H(I_P) + H(I_Q) - H(I_P, I_Q) \quad (9)$$

Figure 11A:
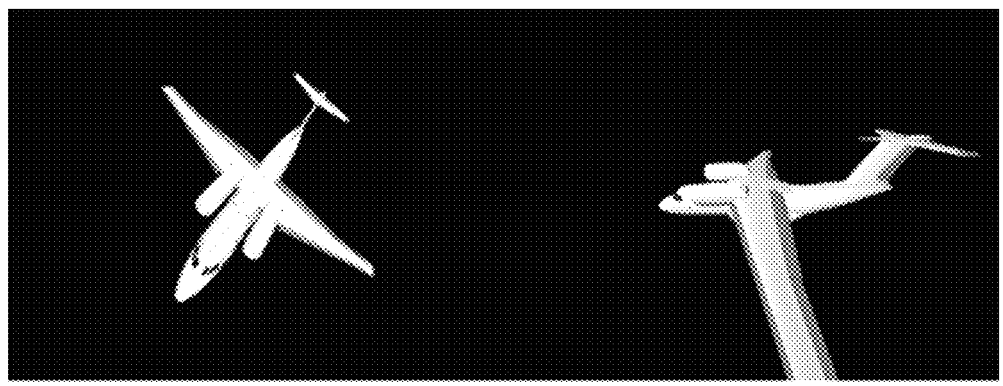
FIGS. 11a and 11b depict a model viewed from different viewpoints, according to embodiments as disclosed herein.
Figure 11B:
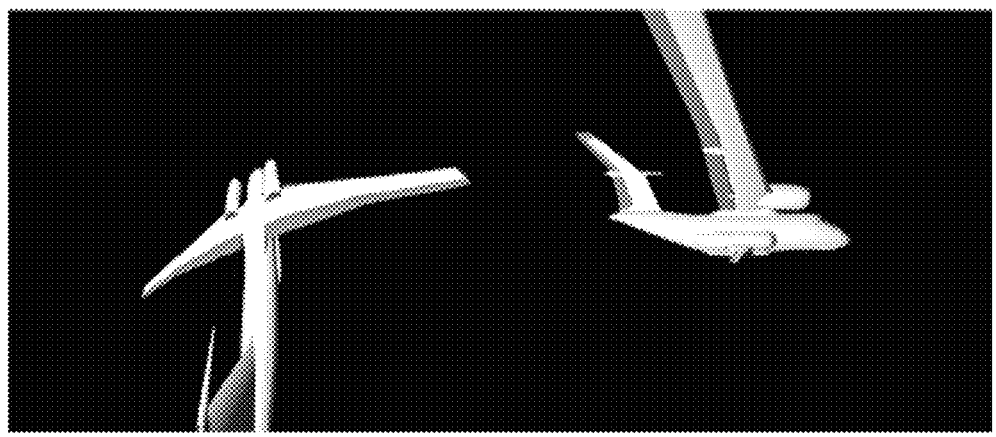

The model viewed from the different viewpoints are depicted as shown in the FIGS. 11a and 11b.

FIGS. 12a to 12g depict the pose estimation with the rigged model, according to embodiments as disclosed herein.

Pose estimation: Having determined the model one can do a finer search on the parameter space for pose estimation. Further, once again uniformly sampled the parameter space (R, ø, θ) are used to generate 2D images per model.

After estimating the pose for $I_L$, the method includes back projecting the challenge point from $I_L$ onto the 3D point on the mesh. While generating $D_P$ other than the image itself, the method includes storing a Modelling, Viewing and Projection (MVP) matrices in a text file along with the depth map as the image. This additional information allowed us to mimic OpenGL's function glUn-Project. Further, the method includes estimating the pose of $I_R$. After estimating, the method includes projecting the 3D point using the stored MVP matrices to determine the position of the challenge point.

Figure 12A:
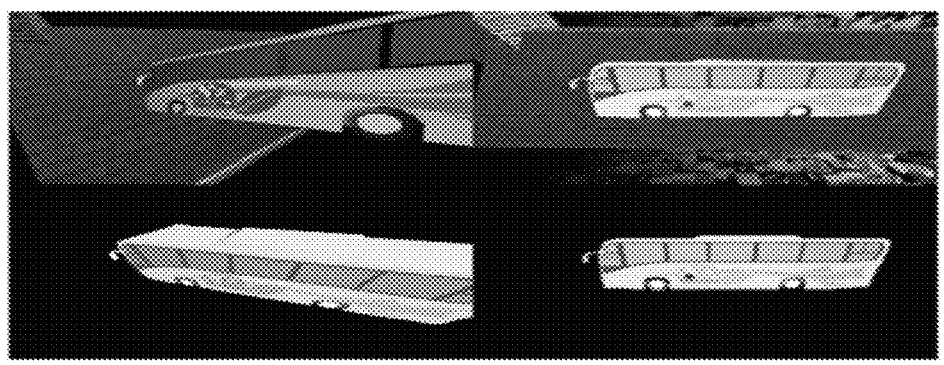
FIGS. 12a to 12g depict a pose estimation with the rigged model, according to embodiments as disclosed herein.
Figure 12B:
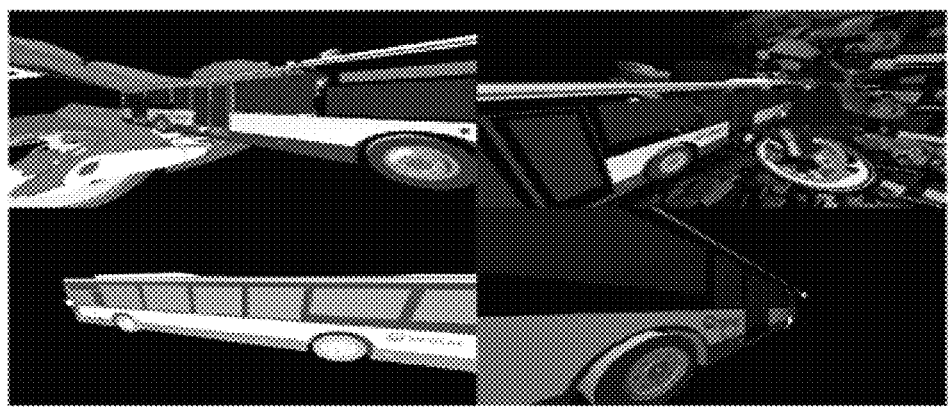
Figure 12C:
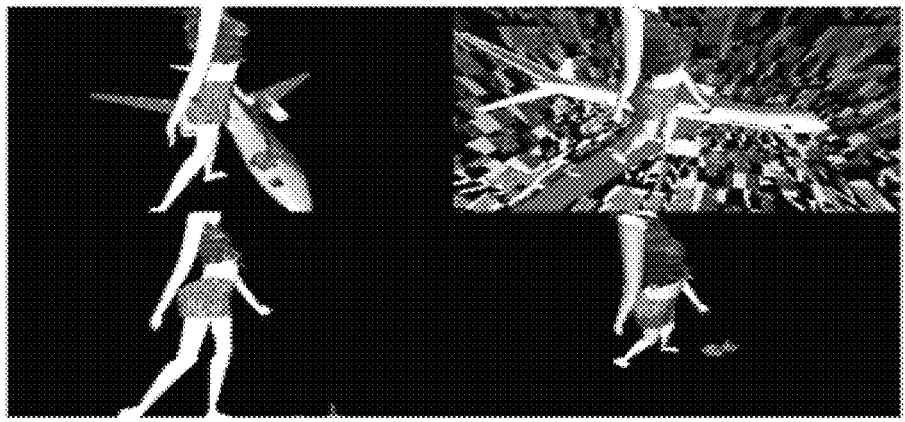
Figure 12D:
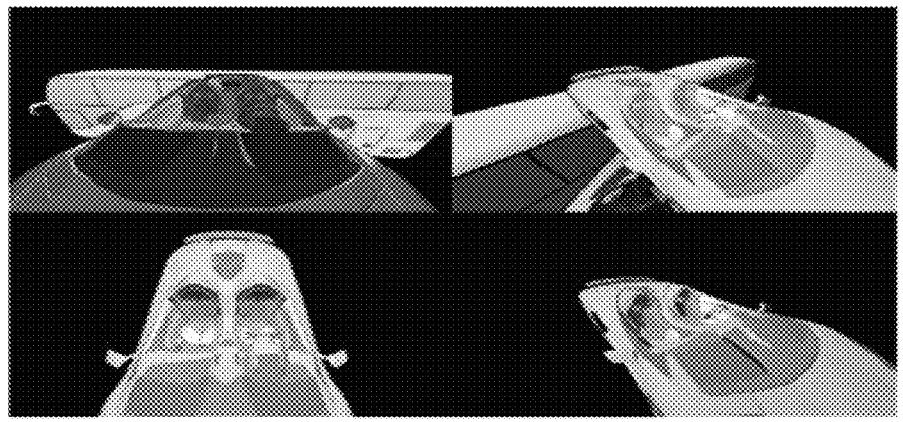
Figure 12E:
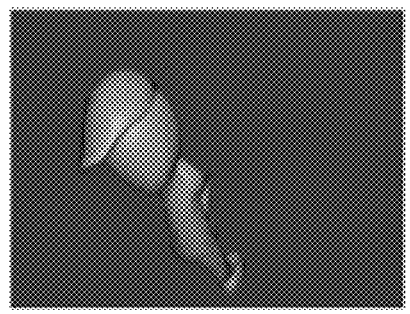
Figure 12E:
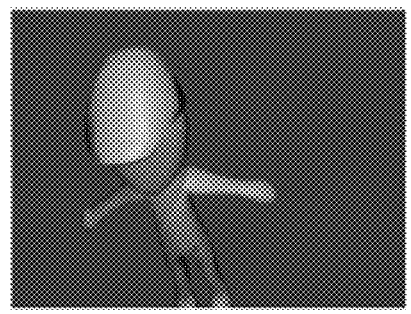
Figure 12F:
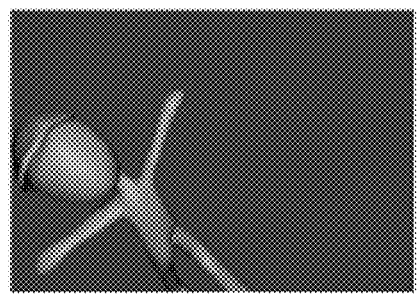
Figure 12F:
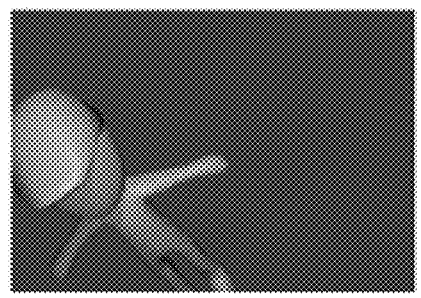
Figure 12G:
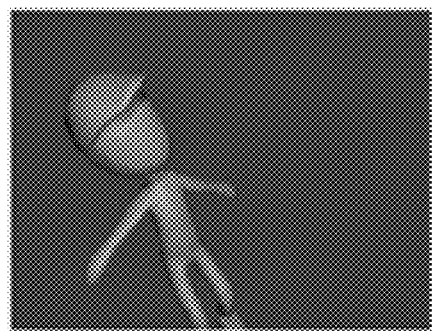
Figure 12G:
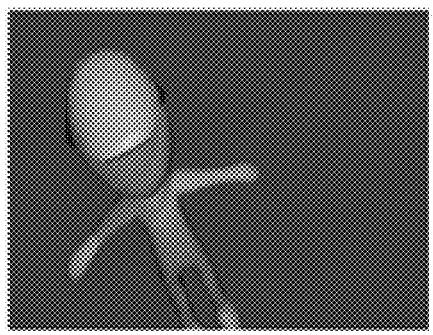

FIGS. 12a to 12d depict where the challenge point is correctly tracked. Top row contains $I_L$ and $I_R$. Bottom row contains the pose estimates for $I_L$ and $I_R$. FIGS. 12e to 12g depicts where the challenge point is correctly tracked.

Figure 13A:
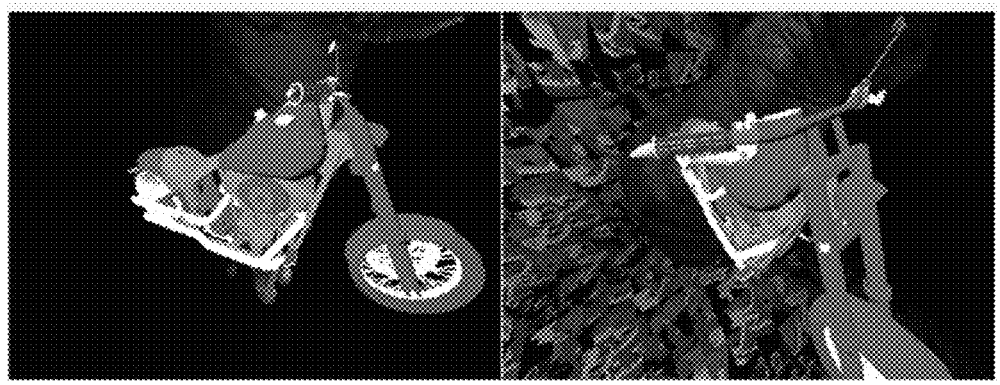
FIGS. 13a and 13b depict an example illustration in which the image-based CAPTCHA challenge is displayed, according to embodiments as disclosed herein.
Figure 13B:
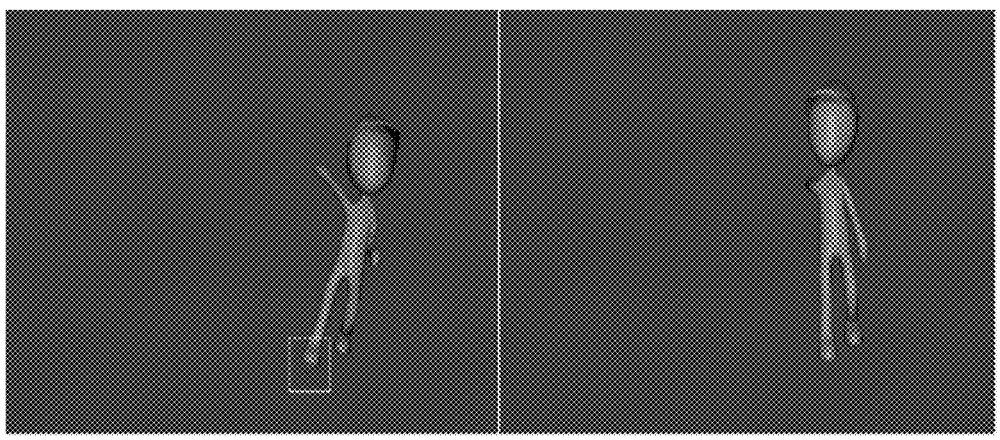

FIGS. 13a and 13b depicts an example illustration in which the image-based CAPTCHA challenge is displayed, according to embodiments as disclosed herein.

Figure 14:
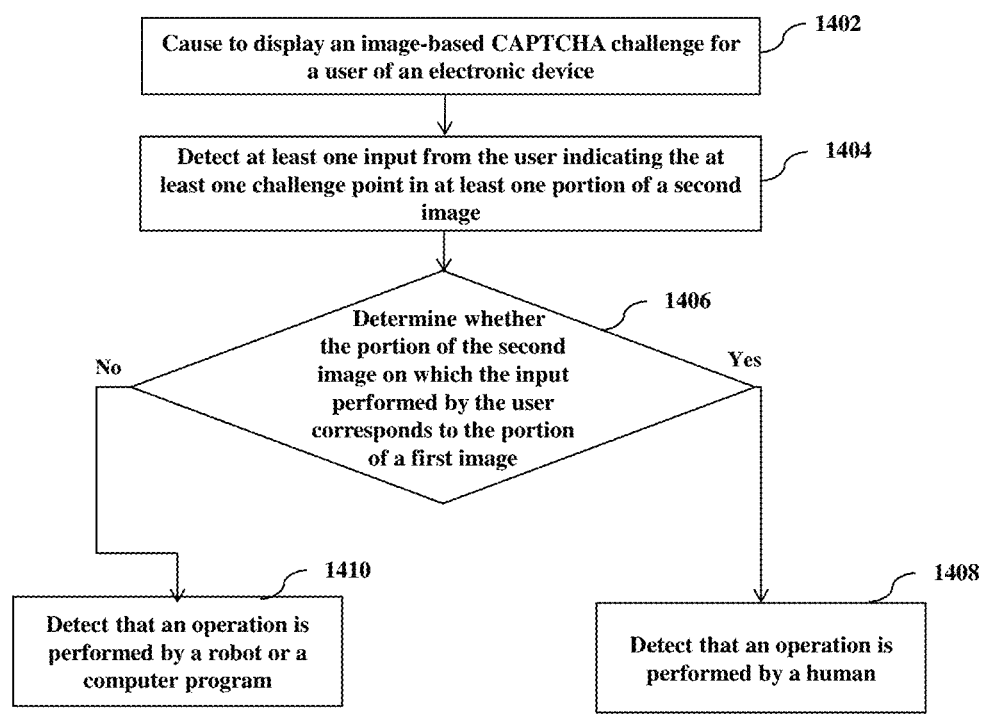
FIG. 14 is a flow diagram illustrating a method for providing a CAPTCHA challenge on the electronic device, when the image-based CAPTCHA challenge includes a first image and a second image of an object displayed from different viewpoints, according to embodiments as disclosed herein.

FIG. 14 is a flow diagram illustrating a method for providing the CAPTCHA challenge on the electronic device 100, when the image-based CAPTCHA challenge includes the first image and the second image of the object displayed from different viewpoints, according to embodiments as disclosed herein. At 1402, the method includes causing to display the image-based CAPTCHA challenge for the user of the electronic device 100. In an embodiment, the method allows the display 120 to display the image-based CAPTCHA challenge for the user of the electronic device. At 1404, the method includes detecting at least one input from the user indicating the at least one challenge point in at least one portion of the second image. In an embodiment, the method allows the image-based CAPTCHA challenge detection controller 133 to detect the at least one input from the user indicating the at least one challenge point in at least one portion of the second image. At 1406, the method includes automatically determining whether the at least one portion of the second image on which the at least one input performed by the user corresponds to the at least one portion of the first image. In an embodiment, the method allows the image-based CAPTCHA challenge determination controller 134 to automatically determine whether the at least one portion of the second image on which the at least one input performed by the user corresponds to the at least one portion of the first image.

If the at least one portion of the second image on which the at least one input performed by the user corresponds to the at least one portion of the first image then, at 1408, the method includes detecting that the operation is performed by the human. If the at least one portion of the second image on which the at least one input performed by the user does not correspond to the at least one portion of the first image then, at 1410, the method includes detecting that the operation is performed by the robot or the computer program.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

Figure 15:
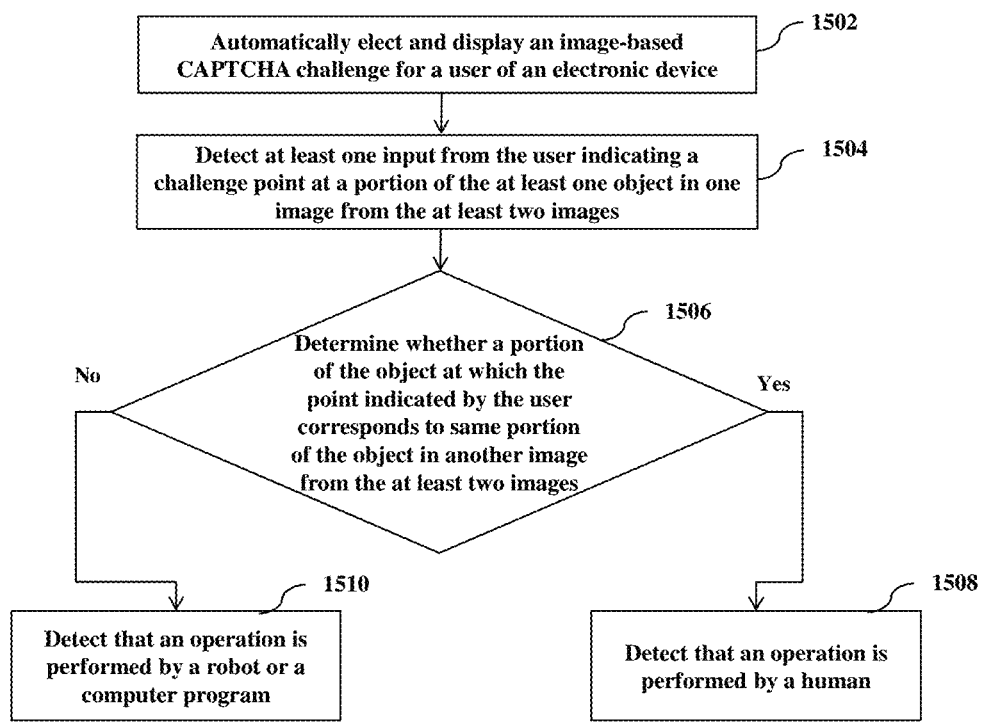
FIG. 15 is a flow diagram illustrating a method for providing an CAPTCHA challenge on the electronic device, when the CAPTCHA challenge comprises at least two images each of which displays at least one rigged model of same object from different viewpoints, according to embodiments as disclosed herein.

FIG. 15 is a flow diagram illustrating a method for method for providing the CAPTCHA challenge on the electronic device 100, when the CAPTCHA challenge comprises at least two images each of which displays at least one rigged model of same object from different viewpoints, according to embodiments as disclosed herein. At 1502, the method includes automatically electing and displaying the image-based CAPTCHA challenge for the user of the electronic device 100. In an embodiment, the method allows the image-based CAPTCHA challenge election controller 132 to automatically elect the image-based CAPTCHA challenge for the user of the electronic device 100. At 1504, the method includes detecting the at least one input from the user indicating the challenge point at the portion of the at least one object in one image from the at least two images. In an embodiment, the method allows the image-based CAPTCHA challenge detection controller 133 to detect the at least one input from the user indicating the challenge point at the portion of the at least one object in one image from the at least two images. At 1506, the method includes automatically determining whether the portion of the object at which the challenge point indicated by the user corresponds to same portion of the object in another image from the at least two images to qualify the user as the human. In an embodiment, the method allows the image-based CAPTCHA challenge determination controller 134 to automatically determine whether the portion of the object at which the challenge point indicated by the user corresponds to same portion of the object in another image from the at least two images.

If the portion of the object at which the challenge point indicated by the user corresponds to same portion of the object in another image from the at least two images then, at 1508, the method includes detecting that the operation is performed by the human. If the portion of the object at which the challenge point indicated by the user does not correspond to same portion of the object in another image from the at least two images then, at 1510, the method includes detecting that the operation is performed by the robot or the computer program.

The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

Figure 16:
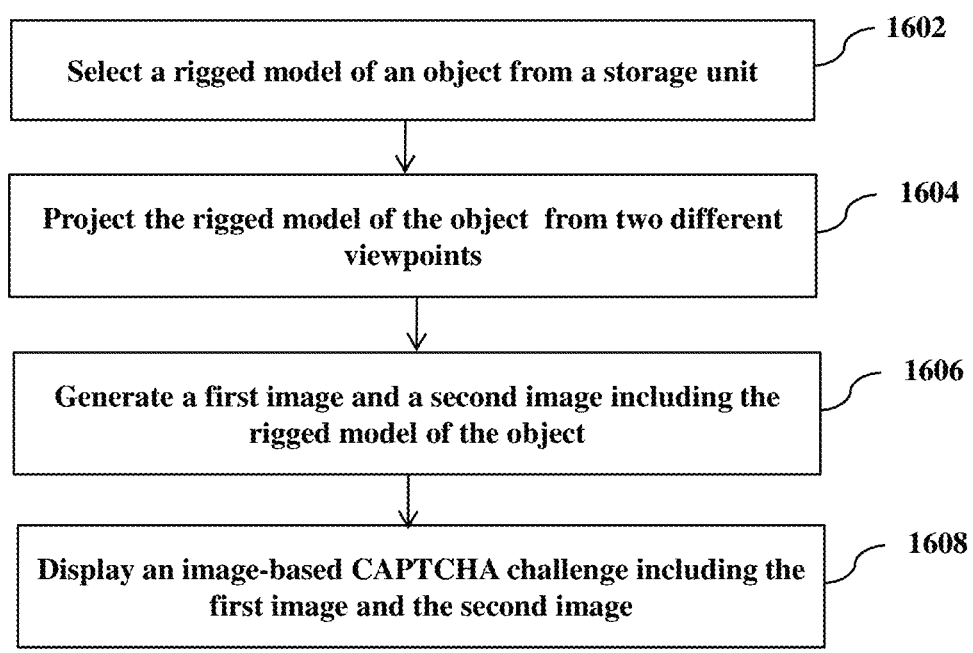
FIG. 16 is a flow diagram illustrating a method for displaying the image-based CAPTCHA challenge for a user of the electronic device, while providing the CAPTCHA challenge on an electronic device, according to embodiments as disclosed herein.

FIG. 16 is a flow diagram illustrating a method for method for displaying the image-based CAPTCHA challenge for the user of the electronic device 100, while providing the CAPTCHA challenge on the electronic device 100, according to embodiments as disclosed herein. The operations of 1602 to 1608 are performed by using the image-based CAPTCHA challenge perform controller 130. At 1602, the method includes selecting a rigged model of an object from the storage 140. At 1604, the method includes projecting the rigged model of the object from two different viewpoints. At 1606, the method includes generating the first image and the second image including the rigged model of the object. At 1608, the method includes displaying the image-based CAPTCHA challenge including the first image and the second image The various actions, acts, blocks, steps, or the like in the flow diagram may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein can be implemented through at least one software program running on at least one hardware device and performing network management functions to control the elements. The elements shown in the FIGS. 2 to 16 include blocks which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implemented method for providing an image-based Completely Automated Public Turing test to Tell Computers and Humans Apart (CAPTCHA) challenge on an electronic device, wherein the method comprises:
   causing to display the image-based CAPTCHA challenge for a user of the electronic device, wherein the image-based CAPTCHA challenge comprises a first image and a second image of at least one three-dimensional (3D) object displayed from different viewpoints, wherein the first image comprises at least one challenge point in at least one portion of the at least one object represented by at least one of existing models in a database or from rigged models wherein the second image is generated from viewpoints of a model of the at least one object present in the first image, wherein the viewpoints are based on a plurality of parameters, wherein the plurality of parameters comprises a distance of a camera from an origin of an object coordinate system, an angle between an optical axis of the camera and a Z-axis of the object coordinate system, and an angle that the optical axis of the camera makes with a Y-axis of the object coordinate system;
   detecting at least one input from the user indicating the at least one challenge point in at least one portion of the second image; and
   automatically determining whether the at least one portion of the second image on which the at least one input provided by the user corresponds to the at least one portion of the first image where the challenge point is displayed to qualify the user as a human.

2. The computer-implemented method of claim 1, wherein automatically determining whether the at least one portion of the second image on which the at least one input provided by the user corresponds to the at least one portion of the first image where the challenge point is displayed to qualify the user as the human comprises:
   automatically determining whether the input selected by the user in the second image is substantially similar to the at least one challenge point associated with the first image based on at least one threshold; and
   determining the user as the human in response to determining that the input selected by the user in the second image is substantially similar to the at least one challenge point associated with the first image.

3. The computer-implemented method of claim 1, wherein the second image is a manipulated version of the first image, wherein the second image is obtained from the manipulated version of the first image by at least one of:
   a) rendering the second image under a lighting condition different than a lighting condition used for rendering the first image;
   b) at least one of (i) rendering a three dimensional (3D) model(to generate the second image, (ii) applying a texture imposition on the 3D model(to generate the second image, (iii) changing a reflectance property of the 3D model(s) to generate the second image, wherein the 3D model(s) is obtained from a database;

c) at least one of (i) applying dithering to the second image, (ii) applying noise to the second image, (iii) applying blur to the second image, (iv) applying occlusions to the second image, (v) applying affine transformations to the second image, and (vi) applying non-rigid spatial warps to the second image;

d) changing of scale of the second image;

e) changing a background portion of the second image while rendering the second image;

f) modifying the second image by at least one of these ways: (i) including an extraneous object in the 3D model of the scene and (ii) removing the objects from the 3D model of the scene, while rendering the each of the images; and g) modifying the pose of the rigged 3D model(s) while rendering the second image.

4. The computer-implemented method of claim 1, wherein the first image and the second image display the rigged model(s) of the object, wherein the rigged models of the at least one object is displayed in the first image from the viewpoint different than the viewpoint in the second image, wherein the object is scaled to a fixed dimension while displaying from the different viewpoints in the first image and the second image.

5. The computer-implemented method of claim 1, wherein the rigged model is obtained from one of an existing database of rigged models, and a database of rigged models created offline by the electronic device.

6. A computer-implemented method for providing an image-based Completely Automated Public Turing test to Tell Computers and Humans Apart (CAPTCHA) challenge on an electronic device, wherein the method comprises:

automatically electing and displaying the image-based CAPTCHA challenge for a user of the electronic device, wherein the CAPTCHA challenge comprises at least two images each of which displays at least one rigged model of same object from different viewpoints, wherein the at least one rigged model is obtained from one of an existing database of rigged models, and a database of rigged models created offline by the electronic device;

detecting at least one input from the user indicating at least one challenge point in a portion of the at least one object in one image from the at least two images; and automatically determining whether the portion of the object at which the challenge point indicated by the user corresponds to same portion of the object in another image from the at least two images to qualify the user as a human.

7. The computer-implemented method of claim 6, wherein automatically determining whether the portion of the object at which the challenge point indicated by the user corresponds to same portion of the object in another image from the at least two images to qualify the user as the human comprises:

automatically determining whether the at least one input from the user indicating the at least one challenge point in the portion of the at least one object in one image is substantially similar to the at least one challenge point associated with the another image based on at least one threshold; and determining the user as the human in response to determining whether the at least one input from the user indicating the at least one challenge point in the portion of the at least one object in one image is substantially similar to the at least one challenge point associated with the another image based on the at least one threshold.

8. The computer-implemented method of claim 6, wherein each of the images are formed by manipulating the at least one rigged model of the object, wherein each of the images is obtained from the manipulated version of the at least one rigged model of the object by at least one of:

a) rendering each of the images under a lighting condition different than a lighting condition used for rendering the rigged model of the object;

b) at least one of rendering a three dimensional (3D) model(s) to generate the each of the images, applying a texture imposition on the 3D model to generate the each of the images, changing a reflectance property of the 3D model(s) to generate the each of the images, wherein the 3D model(s) is obtained from a storage;

c) at least one of applying dithering to the each of the images, applying noise to the each of the images, applying blur to the each of the images, applying occlusions to the each of the images, applying affine to the each of the images, applying non-rigid spatial warps to the each of the images;

d) changing of scale of the each of the images;

e) changing a background portion of the each of the images while rendering the each of the images;

f) modifying the each of the images by at least one of including an extraneous object in the 3D model of the scene and removing the objects from the 3D model of the scene, while rendering the each of the images; and g) modifying the pose of the rigged 3D model in the each of the images while rendering the each of the images.

9. The computer-implemented method of claim 6, wherein the at least one rigged model of the object is displayed in the at least two images from different viewpoints.

10. The computer-implemented method of claim 9, wherein the viewpoint for displaying the at least one rigged model of the at least one object in each of the images are dynamically determined based a distance of a camera from an origin of an object coordinate system, an angle between an optical axis of the camera and a Z-axis of the object coordinate system, and an angle that the optical axis of the camera makes with a Y-axis of the object coordinate system.

11. An electronic device for providing an image-based Completely Automated Public Turing test to Tell Computers and Humans Apart (CAPTCHA) challenge, the electronic device is configured to:

cause to display the image-based CAPTCHA challenge for a user of the electronic device, wherein the image-based CAPTCHA challenge comprises a first image and a second image of at least one three-dimensional (3D) object displayed from different viewpoints, wherein the first image comprises at least one challenge point in at least one portion of the at least one object represented by at least one of existing models in a database or from rigged models wherein the second image is generated from viewpoints of a model of the at least one object present in the first image, wherein the viewpoints are based on a plurality of parameters, wherein the plurality of parameters comprises a distance of a camera from an origin of an object coordinate system, an angle between an optical axis of the camera and a Z-axis of the object coordinate system, and an angle that the optical axis of the camera makes with a Y-axis of the object coordinate system;

detect at least one input from the user indicating the at least one challenge point in at least one portion of the second image; and automatically determine whether the at least one portion of the second image on which the at least one input provided by the user corresponds to the at least one portion of the first image where the challenge point is displayed to qualify the user as a human.

12. The electronic device of claim 11, wherein automatically determine whether the at least one portion of the second image on which the at least one input provided by the user corresponds to the at least one portion of the first image where the challenge point is displayed to qualify the user as the human comprises:

automatically determine whether the input selected by the user in the second image is substantially similar to the at least one challenge point associated with the first image based on at least one threshold; and determine the user as the human in response to determining that the input selected by the user in the second image is substantially similar to the at least one challenge point associated with the first image.

13. The electronic device of claim 11, wherein the second image is a manipulated version of the first image, wherein the second image is obtained from the manipulated version of the first image by at least one of:

a) rendering the second image under a lighting condition different than a lighting condition used for rendering the first image;

b) at least one of (i) rendering a three dimensional (3D) model(s) to generate the second image, (ii) applying a texture imposition on the 3D model(s) to generate the second image, (iii) changing a reflectance property of the 3D model(s) to generate the second image, wherein the 3D model(s) is obtained from a database;

c) at least one of (i) applying dithering to the second image, (ii) applying noise to the second image, (iii) applying blur to the second image, (iv) applying occlusions to the second image, (v) applying affine transformations to the second image, and (vi) applying non-rigid spatial warps to the second image;

d) changing of scale of the second image;

e) changing a background portion of the second image while rendering the second image;

f) modifying the second image by at least one of these ways: (i) including an extraneous object in the 3D model of the scene and (ii) removing the objects from the 3D model of the scene, while rendering the each of the images; and g) modifying the pose of the rigged 3D model(s) while rendering the second image.

14. The electronic device of claim 11, wherein the first image and the second image display the rigged model(s) of the object, wherein the rigged models of the at least one object is displayed in the first image from the viewpoint different than the viewpoint in the second image, wherein the object is scaled to a fixed dimension while displaying from the different viewpoints in the first image and the second image.

15. The electronic device of claim 11, wherein the rigged model is obtained from one of an existing database of rigged models, and a database of rigged models created offline by the electronic device.

16. An electronic device for providing an image-based Completely Automated Public Turing test to Tell Computers and Humans Apart (CAPTCHA) challenge, the electronic device is configured to:

automatically elect and display the image-based CAPTCHA challenge for a user of the electronic device, wherein the CAPTCHA challenge comprises at least two images each of which displays at least one rigged model of same object from different viewpoints, wherein the at least one rigged model is obtained from one of an existing database of rigged models, and a database of rigged models created offline by the electronic device;

detect at least one input from the user indicating at least one challenge point in a portion of the at least one object in one image from the at least two images; and automatically determine whether the portion of the object at which the challenge point indicated by the user corresponds to same portion of the object in another image from the at least two images to qualify the user as a human.

17. The electronic device of claim 16, wherein automatically determine whether the portion of the object at which the challenge point indicated by the user corresponds to same portion of the object in another image from the at least two images to qualify the user as the human comprises:

automatically determine whether the at least one input from the user indicating the at least one challenge point in the portion of the at least one object in one image is substantially similar to the at least one challenge point associated with the another image based on at least one threshold; and determine the user as the human in response to determining whether the at least one input from the user indicating the at least one challenge point in the portion of the at least one object in one image is substantially similar to the at least one challenge point associated with the another image based on the at least one threshold.

18. The electronic device of claim 16, wherein in each of the images are formed by manipulating the at least one rigged model of the object, wherein each of the images is obtained from the manipulated version of the at least one rigged model of the object by at least one of:

a) rendering each of the images under a lighting condition different than a lighting condition used for rendering the rigged model of the object;

b) at least one of rendering a three dimensional (3D) model(s) to generate the each of the images, applying a texture imposition on the 3D model(s) to generate the each of the images, changing a reflectance property of the 3D model(s) to generate the each of the images, wherein the 3D model(s) is obtained from a storage;

c) at least one of applying dithering to the each of the images, applying noise to the each of the images, applying blur to the each of the images, applying occlusions to the each of the images, applying affine to the each of the images, applying non-rigid spatial warps to the each of the images;

d) changing of scale of the each of the images;

e) changing a background portion of the each of the images while rendering the each of the images;

f) modifying the each of the images by at least one of including an extraneous object in the 3D model of the scene and removing the objects from the 3D model of the scene, while rendering the each of the images; and g) modifying the pose of the rigged 3D model in the each of the images while rendering the each of the image.

19. The electronic device of claim 16, wherein the at least one rigged model of the object is displayed in the at least two images from different viewpoints.

20. The electronic device of claim 19, wherein the viewpoint for displaying the at least one rigged model of the at least one object in each of the images are dynamically determined based a distance of a camera from an origin of the object coordinate system, an angle between an optical axis of the camera and a Z-axis of the object coordinate system, and an angle that the optical axis of the camera makes with a Y-axis of the object coordinate system.

* * * * *